(12) United States Patent
Chason

(10) Patent No.: US 10,672,290 B1
(45) Date of Patent: Jun. 2, 2020

(54) METHOD OF LEARNING, TEACHING, AND PLAYING GUITAR

(71) Applicant: Willard Brian Chason, Tallahassee, FL (US)

(72) Inventor: Willard Brian Chason, Tallahassee, FL (US)

(*) Notice: Subject to any disclaimer, the term of this patent is extended or adjusted under 35 U.S.C. 154(b) by 0 days.

(21) Appl. No.: 16/217,286

(22) Filed: Dec. 12, 2018

(51) Int. Cl.
| | |
|---|---|
| *G09B 15/00* | (2006.01) |
| *G10D 3/14* | (2020.01) |
| *G10D 3/10* | (2006.01) |
| *C10G 1/02* | (2006.01) |
| *G10G 1/02* | (2006.01) |

(52) U.S. Cl.
CPC .......... *G09B 15/004* (2013.01); *G10D 3/10* (2013.01); *G10D 3/14* (2013.01); *G10G 1/02* (2013.01)

(58) Field of Classification Search
CPC .......... G09B 15/004; G10G 1/02; G10D 3/14; G10D 3/10
USPC ...................................................... 84/477 R
See application file for complete search history.

(56) References Cited

U.S. PATENT DOCUMENTS

| | | | | |
|---|---|---|---|---|
| 3,153,970 A | * | 10/1964 | Mulchi | G10D 3/04 84/485 R |
| 4,537,111 A | * | 8/1985 | Heath | G09B 15/009 283/44 |
| 4,712,464 A | * | 12/1987 | Nance | G10D 3/06 84/453 |
| 4,856,404 A | | 8/1989 | Hughes, Sr. | |
| 5,398,581 A | | 3/1995 | Castillo | |
| 5,458,040 A | * | 10/1995 | Lawrence, Jr. | G09B 15/006 84/473 |
| 5,834,665 A | | 11/1998 | Hanns et al. | |
| 6,127,615 A | | 10/2000 | Rosenberg | |
| 6,365,808 B1 | | 4/2002 | Murrell | |
| 6,870,085 B2 | * | 3/2005 | MacCutcheon | G09B 15/023 84/477 R |
| 7,446,248 B2 | | 11/2008 | Skinn et al. | |
| 7,875,786 B2 | * | 1/2011 | Hammond | G09B 15/02 84/477 R |
| 8,399,756 B1 | * | 3/2013 | Trent | G10D 3/06 84/314 R |
| 9,812,107 B2 | | 11/2017 | Butera | |
| 9,839,852 B2 | | 12/2017 | Epstein | |
| 2005/0011333 A1 | | 1/2005 | Murrell | |
| 2005/0011334 A1 | | 1/2005 | Murrell | |
| 2005/0011335 A1 | | 1/2005 | Murrell | |
| 2007/0034070 A1 | * | 2/2007 | Hammond | G09B 15/02 84/477 R |

(Continued)

OTHER PUBLICATIONS

"Drop D Tuning," Wikipedia, printed Jul. 21, 2019.*

*Primary Examiner* — Jeffrey Donels
(74) *Attorney, Agent, or Firm* — Dunlap Bennett & Ludwig PLLC

(57) ABSTRACT

A method of stringing and tuning and learning to play a guitar. The strings are first reversed from a traditionally strung guitar. The guitar is strung such that a first string (lightest) is at a top of the fret board and a remainder of the strings are disposed consecutively from top to bottom until a sixth string, which is at the bottom of the fret board. The method further includes tuning the guitar so that the first string plays an E note, the second string plays a B note, the third string plays a G note, the fourth string plays a D note, the fifth string plays an A note, and the sixth string plays a D note.

10 Claims, 15 Drawing Sheets

(56) References Cited

U.S. PATENT DOCUMENTS

| | | | |
|---|---|---|---|
| 2010/0137048 A1* | 6/2010 | Kim | G09B 15/003 463/7 |
| 2011/0146472 A1* | 6/2011 | Chetrit | G10D 1/08 84/298 |
| 2012/0167746 A1* | 7/2012 | Jacobsen | G09B 15/008 84/477 R |
| 2014/0053705 A1* | 2/2014 | Goto | G10D 3/04 84/298 |
| 2018/0040309 A1 | 2/2018 | Ronnow | |
| 2018/0061377 A1 | 3/2018 | Berg | |
| 2018/0061378 A1* | 3/2018 | Berg | G10D 3/12 |
| 2018/0277069 A1* | 9/2018 | Jalgha | G10D 3/14 |

* cited by examiner

STEP ONE: STRINGS ARE COMPLETELY REVERSED FROM TRADITIONAL METHOD.
STEP TWO; TUNING CHANGE... DESCRIBED BELOW.

| STRING # | 6 | 5 | 4 | 3 | 2 | 1 |
|---|---|---|---|---|---|---|
| TRADITIONAL TUNING | E | A | D | G | B | E |
| NOW GO GUITAR TUNING | D | A | D | G | B | E |

HEAVY → LIGHT

THIS NEW METHOD IS FOR BOTH RIGHT HANDED AND LEFT HANDED PLAYERS

FIG.1

PLAY ONLY THE THREE HEAVIEST STRINGS

MAKING 3 STRING CHORDS
(ROOT CHORDS)

| FRET | CHORD |
|------|-------|
| OPEN | D |
| 1ST | D# |
| 2ND | E |
| 3RD | F |
| 4TH | F# |
| 5TH | G |
| 6TH | G# |
| 7TH | A |
| 8TH | A# |
| 9TH | B |
| 10TH | C |
| 11TH | C# |
| 12TH | D |
| ETC... | |

(FOLLOWS THE MUSICAL SCALE ON A PIANO)

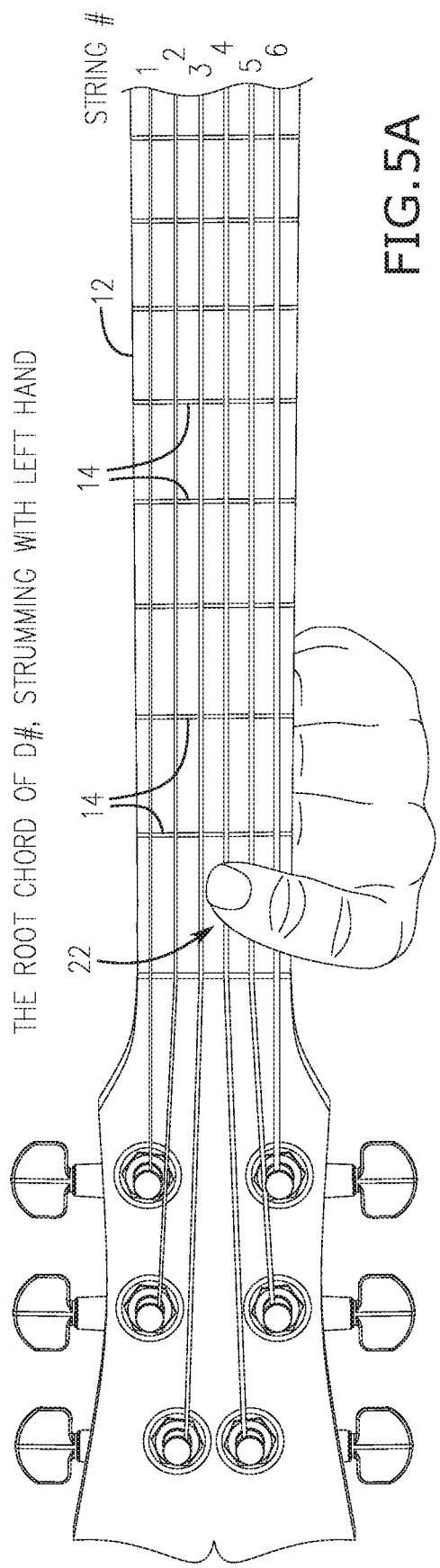
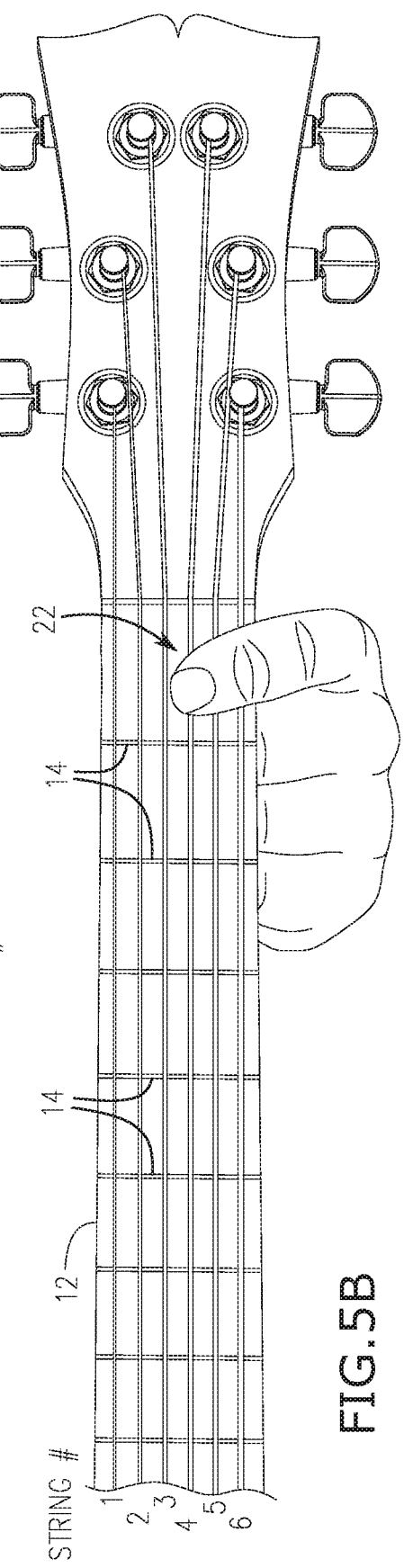

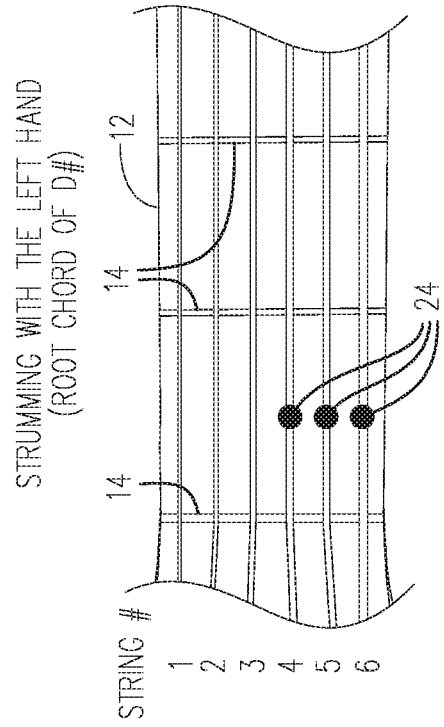

CHORD
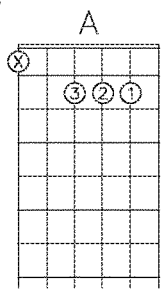 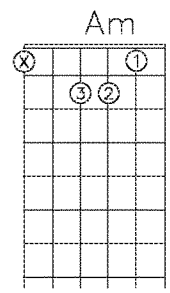 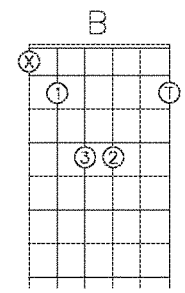 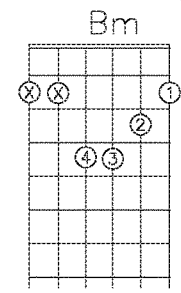
CHORD
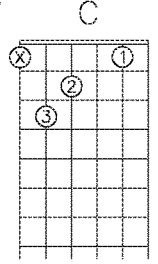 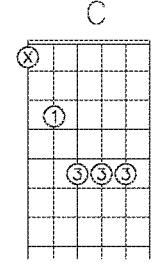 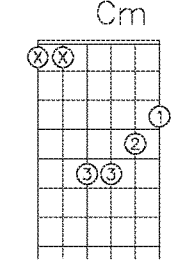 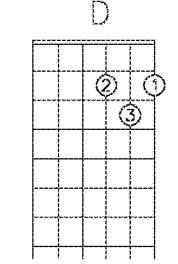
FIG.10B CHORD
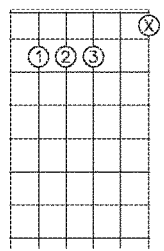 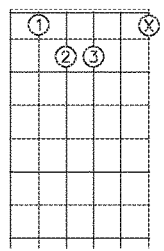 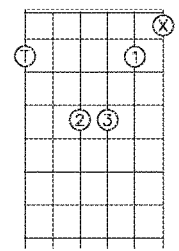 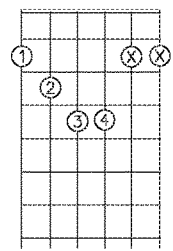
CHORD
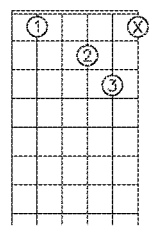 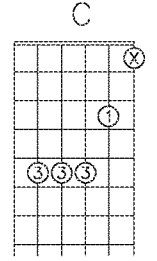 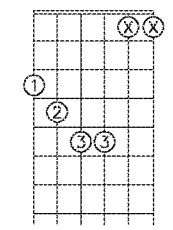 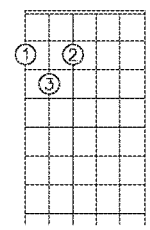
FIG.11B

METHOD OF LEARNING, TEACHING, AND PLAYING GUITAR

BACKGROUND OF THE INVENTION

The present invention relates to playing a guitar or a four-string bass guitar and more particularly, to a method of learning, teaching, and playing a guitar with the use of a chord card.

The guitar is a fretted musical instrument that usually has six strings. It is typically played with both hands by strumming or plucking the strings with either a guitar pick or the finger(s)/fingernails of one hand, while simultaneously fretting (pressing the strings against the frets) with the fingers of the other hand. The sound of the vibrating strings is projected either acoustically, by means of the hollow chamber of the guitar (for an acoustic guitar), or through an electrical amplifier and a speaker.

The guitar strings include heavy strings having a larger gauge and light strings have a smaller gauge. The heavy strings are at the top of the fretboard and the light strings are at the bottom of the fretboard. Currently, to learn how to play guitar, each individual chord must be memorized and there is no natural progression to learn.

As can be seen, there is a need for an improved method of teaching and playing guitar.

SUMMARY OF THE INVENTION

In one aspect of the present invention, a method of tuning and learning to play a guitar comprises steps of: providing a guitar comprising a fret board and a plurality of strings, wherein the fret board comprises at least a first fret, a second fret, a third fret, a fourth fret, a fifth fret, and a sixth fret, and the plurality of strings comprise at least a first string, a second string, a third string, a fourth string, a fifth string, and a sixth string, wherein a gauge of each string increases from the first string to the sixth string; stringing the guitar such that the first string (lightest) is at a top of the fret board and stringing a remainder of the strings consecutively until the sixth string is at a bottom of the fret board; and tuning the guitar such that the fourth string plays a D note, the fifth string plays an A note, and the sixth string plays a D note. The method allows playing "EASY" three string chords and building larger chords on this foundation. The Chord Card illustrates how the method follows the musical scale.

These and other features, aspects and advantages of the present invention will become better understood with reference to the following drawings, description and claims.

BRIEF DESCRIPTION OF THE DRAWINGS

FIG. 1 is a chart of the present invention illustrating a tuning method;

FIG. 5A is a detail front elevation view showing fingering of the root chord of D # in a left-hand strumming mode;

FIG. 5B is a detail front elevation view showing fingering of the root chord of D # in a right-hand strumming mode;

FIG. 5C shows a schematic fingering pattern for the root chord of D # in a left-hand strumming mode;

FIG. 8 is a front view of a left-handed braille chord card;

FIG. 9 is a front view of a right-handed braille chord card;

FIG. 10B is a front view of a left-handed musical scale continued from FIG. 10A;

FIG. 11B is a front view of a right-handed musical scale continued from FIG. 11A.

DETAILED DESCRIPTION OF THE INVENTION

Figure 2A:
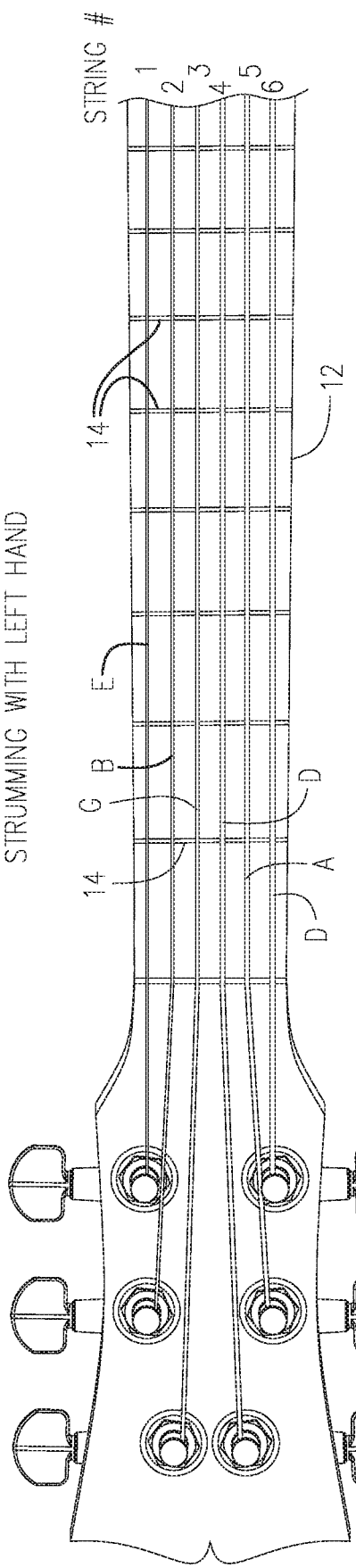
FIG. 2A is a detail front elevation view of a guitar in a left-hand strumming mode.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a new way to play and learn guitar; when the heavy strings are positioned at the bottom of the fret board, the three strings at the bottom of the fretboard form a "perfect fifth" and follow the musical scale found on a piano. The method allows a player to play chords on a guitar with less difficulty. With one tuning change, the bottom three strings form a "bass" section that allows a player to build upon this foundation. This setup allows for different note configurations in making chords—for example: a six string F Major.

Referring to FIG. 1, the present invention includes an initial setup of stringing and tuning a guitar 10. The guitar includes a fret board and a plurality of strings. The fret board includes at least a first fret, a second fret, a third fret, a fourth fret, a fifth fret, and a sixth fret. The plurality of strings include at least a first string, a second string, a third string, a fourth string, a fifth string, and a sixth string. A gauge of each string increases from the first string to the sixth string. The strings are reversed from a traditionally strung guitar. The guitar is strung such that the first string is at a top of the fret board and a remainder of the strings are disposed consecutively from top to bottom until the sixth string, which is at the bottom of the fret board. The method 10 further includes tuning the guitar with the strings reversed. A traditional tuning 10a includes the first string playing an E note, the second string playing a B note, the third string playing a G note, the fourth string playing a D note, the fifth string playing an A note, and the sixth string playing an E note. The tuning of the present invention 10b includes the first string playing an E note, the second string playing a B note, the third string playing a G note, the fourth string playing a D note, the fifth string playing an A note, and the sixth string playing a D note. The difference being the sixth string 11.

Figure 2B:
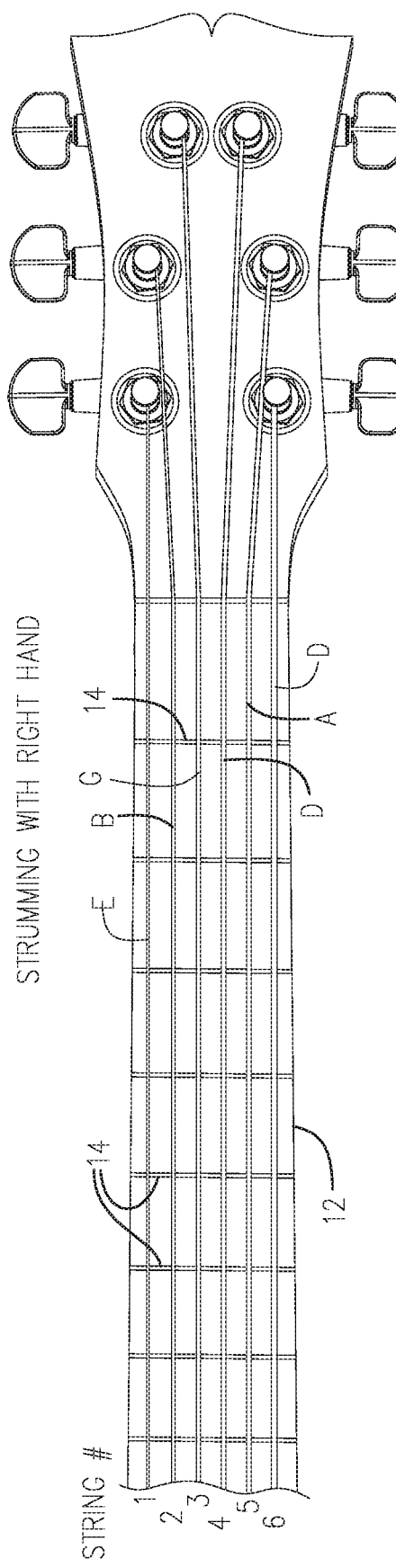
FIG. 2B is a detail front elevation view of a guitar in a right-hand strumming mode.

FIGS. 2A and 2B illustrate a guitar of the present invention with the tuning and stringing of the present invention. As illustrated, the guitar includes a guitar neck 12 having a plurality of frets 14. The plurality of frets 14 includes the first fret, the second fret, the third fret, the fourth fret, the fifth fret, and the sixth fret. The guitar further includes the plurality of strings including the first string, the second string, the third string, the fourth string, the fifth string, and the sixth string. For both the left handed and right handed guitar, the first string is tuned to play an E note, the second string is tuned to play a B note, the third string is tuned to play a G note, the fourth string is tuned to play a D note, the fifth string is tuned to play an A note, and the sixth string is tuned to play a D note.

Figure 3A:
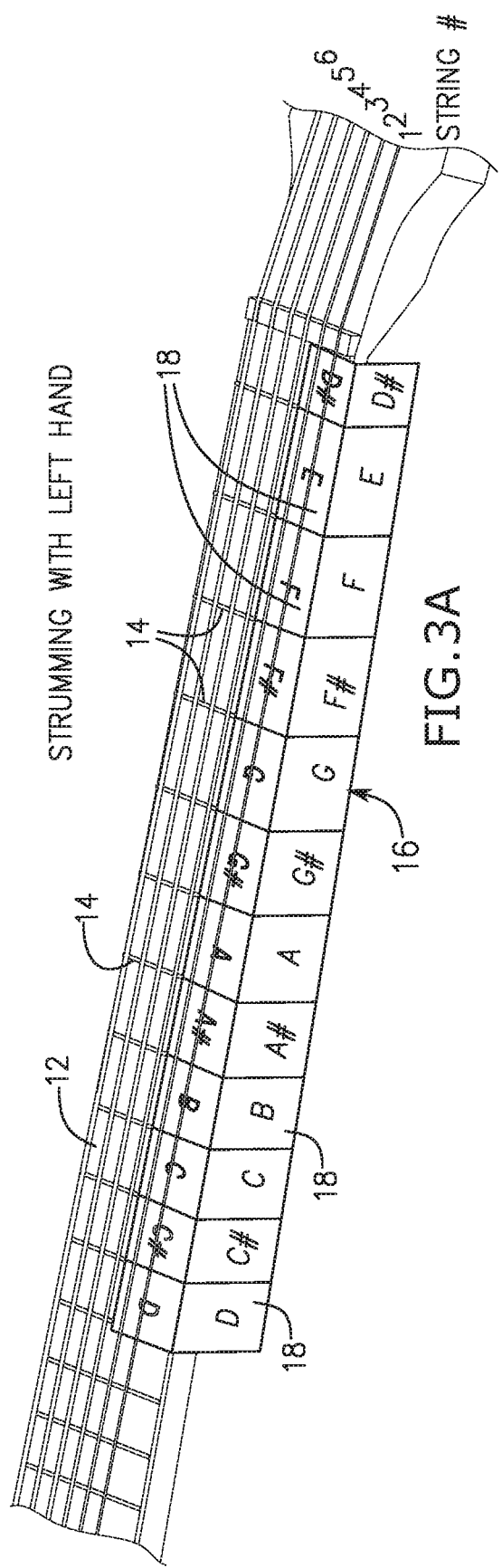
FIG. 3A shows a chord guide accessory used for strumming with the left hand.
Figure 3B:
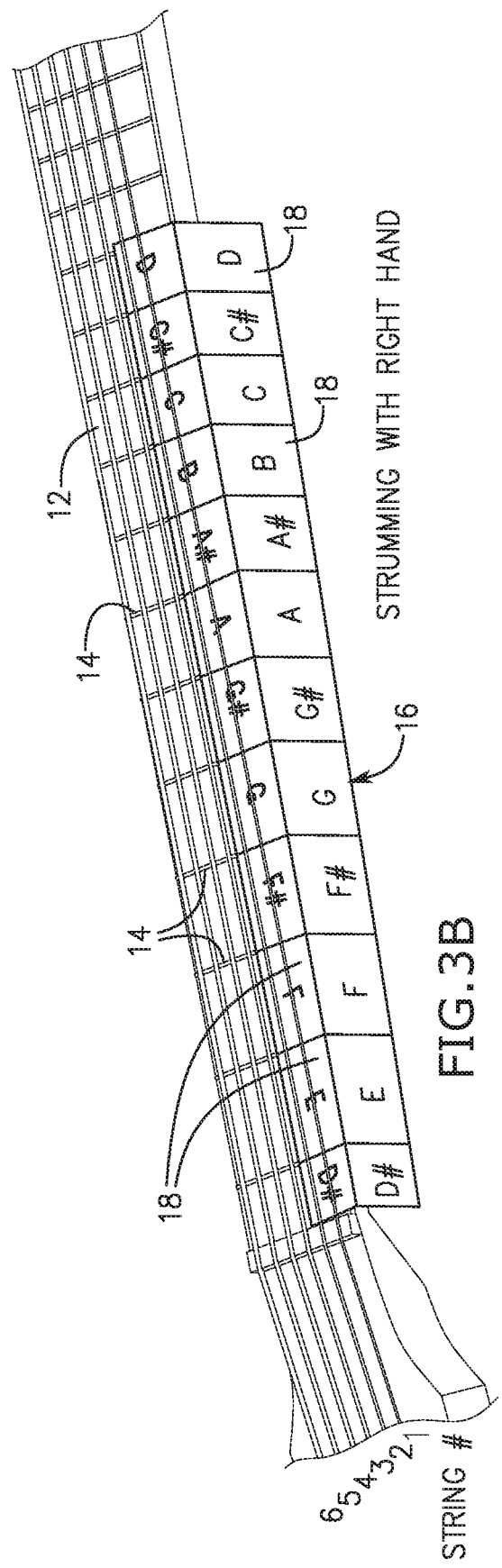
FIG. 3B shows a chord guide accessory used for strumming with the right hand.
Figures 8, 9:
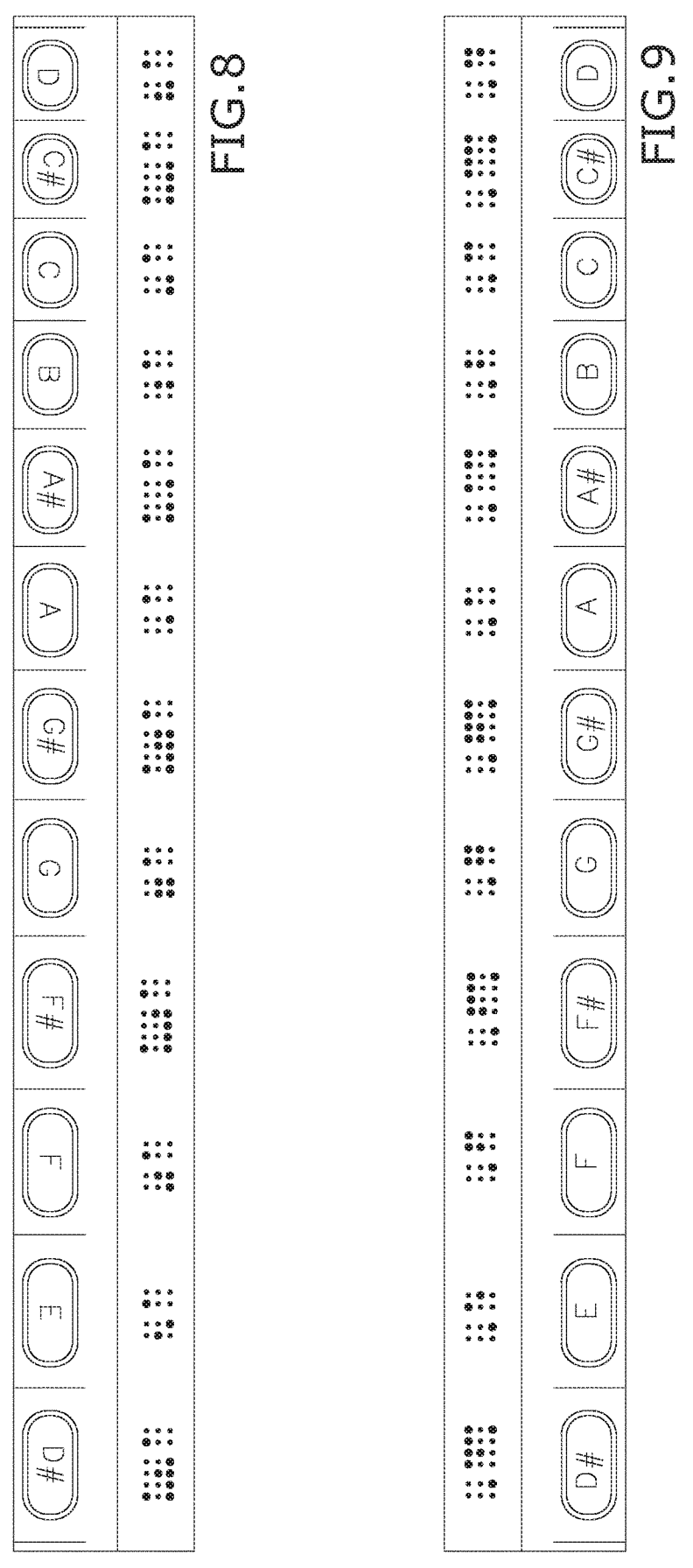

FIGS. 3A and 3B illustrate the guitar with the guitar neck 12, the frets 14, the six strings, as well as a chord card 16. The chord card 16 includes a plurality of printed indicia 18, including a printed D #, a printed E, a printed F, a printed F #, a printed G, a printed G #, a printed A, a printed A #, a printed B, a printed C, a printed C #, a printed D, etc. The plurality of printed indicia 18 are spaced apart to correspond with a different fret 14. The method further includes the step of placing the chord card 16 underneath at least the first string of the guitar such that the printed D # is disposed in the first fret, the printed E is disposed in the second fret, the printed F is disposed in the third fret, the printed F # is disposed in the fourth fret, the printed G is disposed in the fifth fret, and the printed G # is disposed in the sixth fret, the printed A is disposed in the seventh fret, the printed A # is disposed in the eighth fret, the printed B is disposed in the ninth fret, the printed C is disposed in the tenth fret, the printed C # is disposed in the eleventh fret, and the printed D is disposed in the twelfth fret. The chord card 16 may further include a fold and a second set of printed indicia including an upside down indicia of the plurality of printed indicia. The upside down indicia are separated from the right side up indicia by the fold. This allows the guitar player to see the notes and corresponding frets 14 from above. As illustrated in FIGS. 8 and 9 the chord card 16 may also include braille for each of the printed indicia 18.

Figure 4:
FIG. 4 is a table of 3-string chords.
Figure 6A:
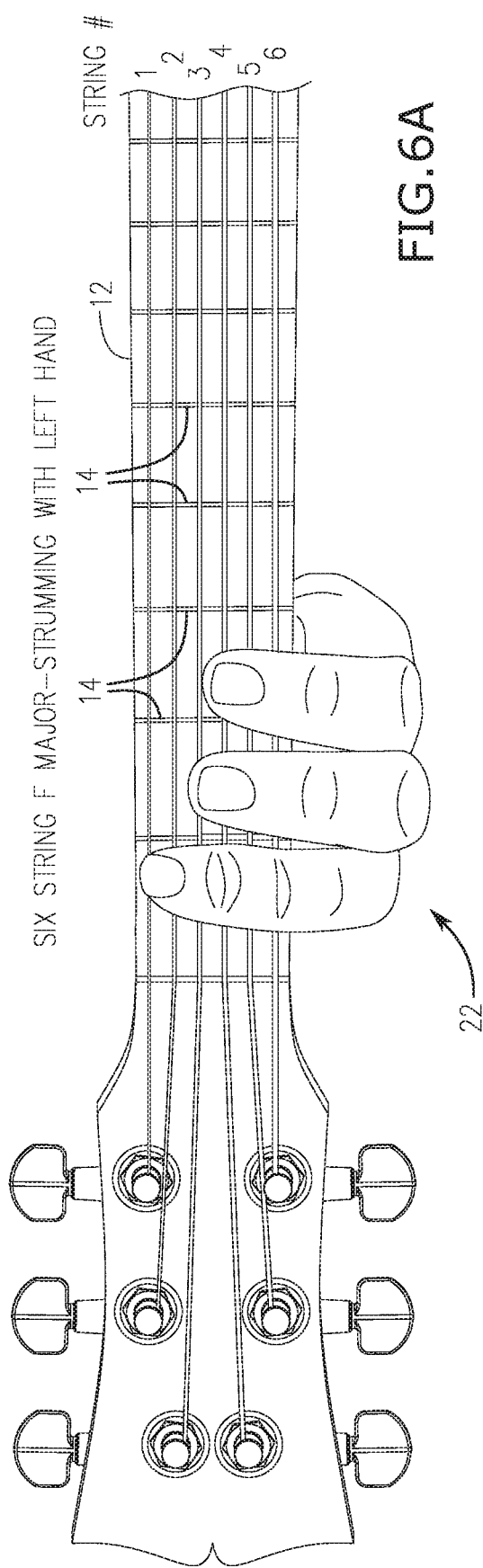
FIG. 6A is a detail front elevation view showing fingering of the six-string F Major chord in a left-hand strumming mode.
Figure 6B:
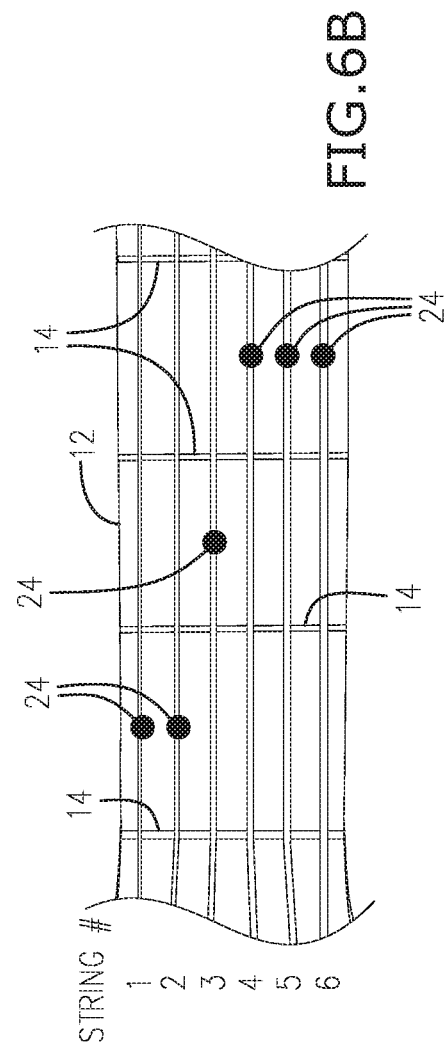
FIG. 6B shows a schematic fingering pattern for the six-string F Major chord in a left-hand strumming mode.
Figure 6C:
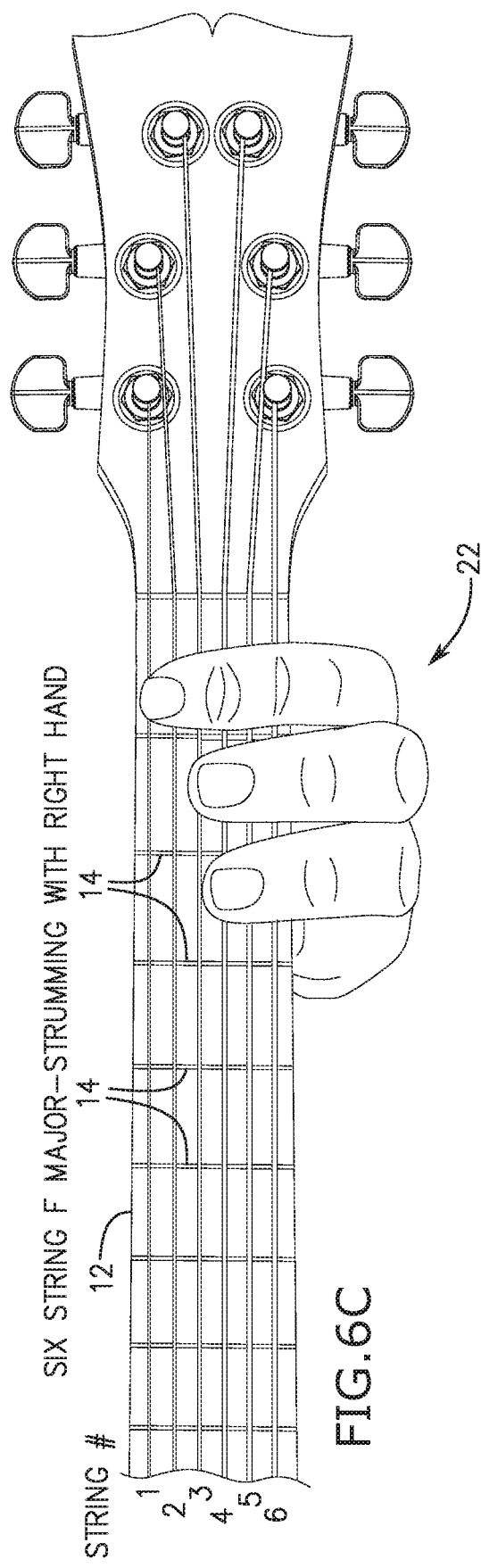
FIG. 6C is a detail front elevation view showing fingering of the six-string F Major chord in a right-hand strumming mode.
Figure 6D:
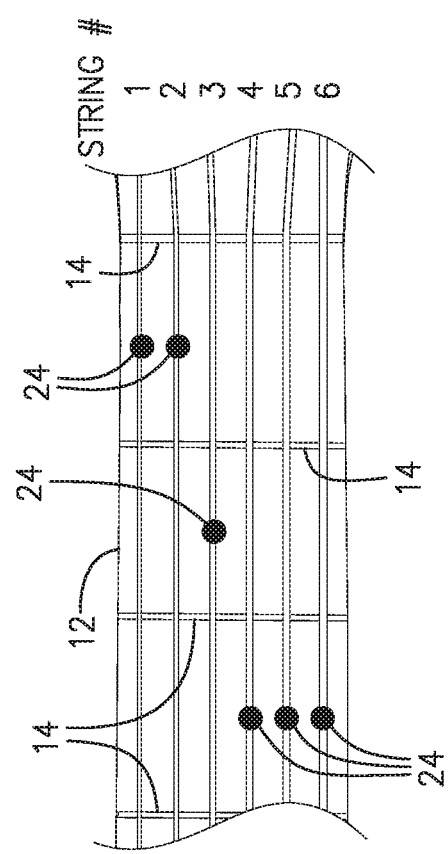
FIG. 6D shows a schematic fingering pattern for the six-string F Major chord in a right-hand strumming mode.
Figure 7A:
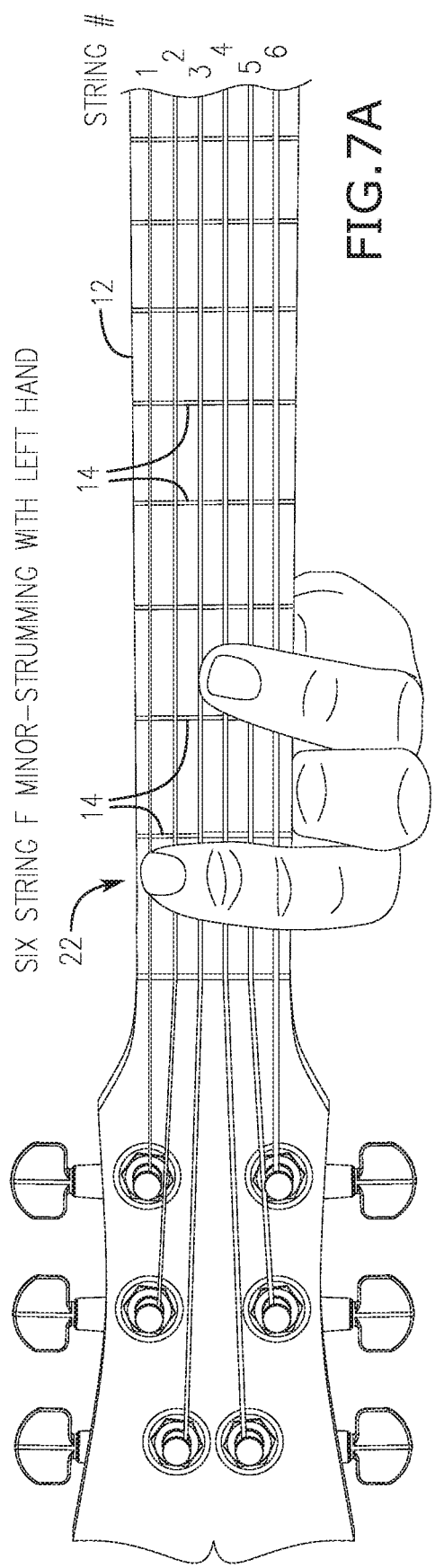
FIG. 7A is a detail front elevation view showing fingering of the six-string F Minor chord in a left-hand strumming mode.
Figure 7B:
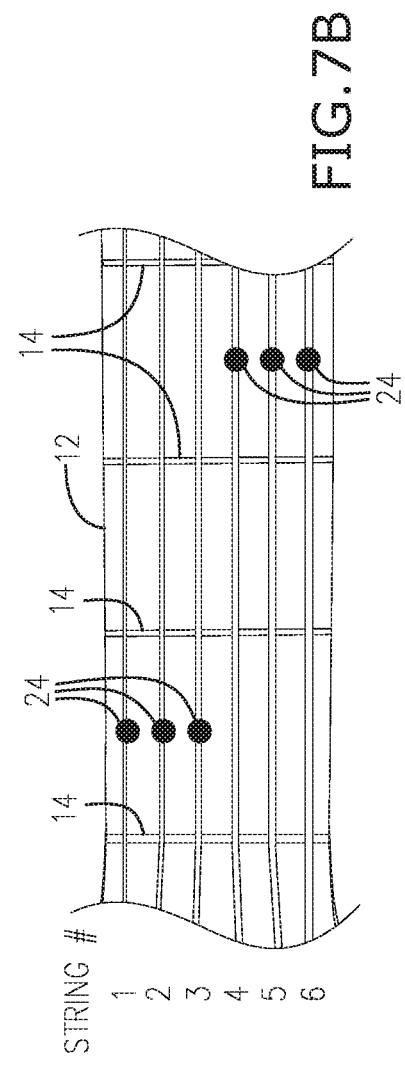
FIG. 7B shows a schematic fingering pattern for the six-string F Minor chord in a left-hand strumming mode.
Figure 7C:
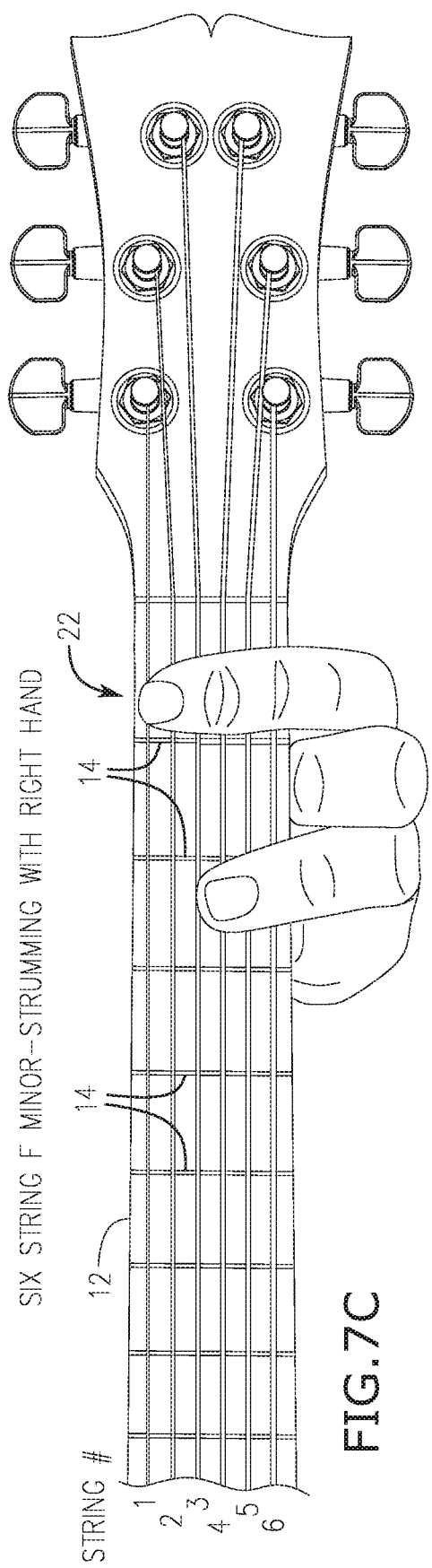
FIG. 7C is a detail front elevation view showing fingering of the six-string F Minor chord in a right-hand strumming mode.
Figure 7D:
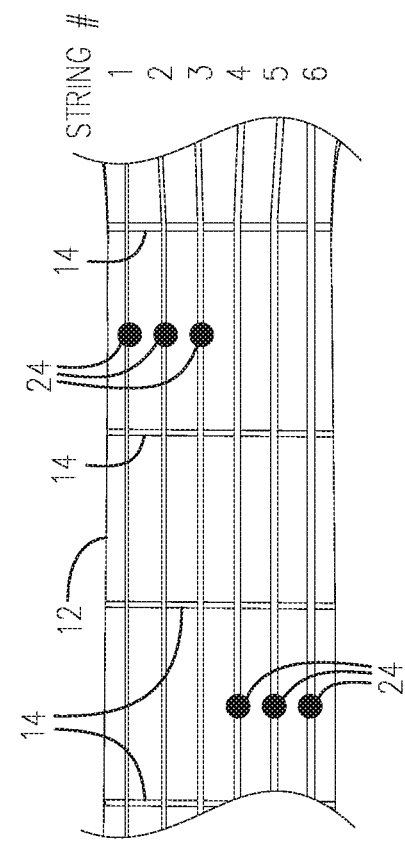
FIG. 7D shows a schematic fingering pattern for the six-string F Minor chord in a right-hand strumming mode.
Figure 10A:
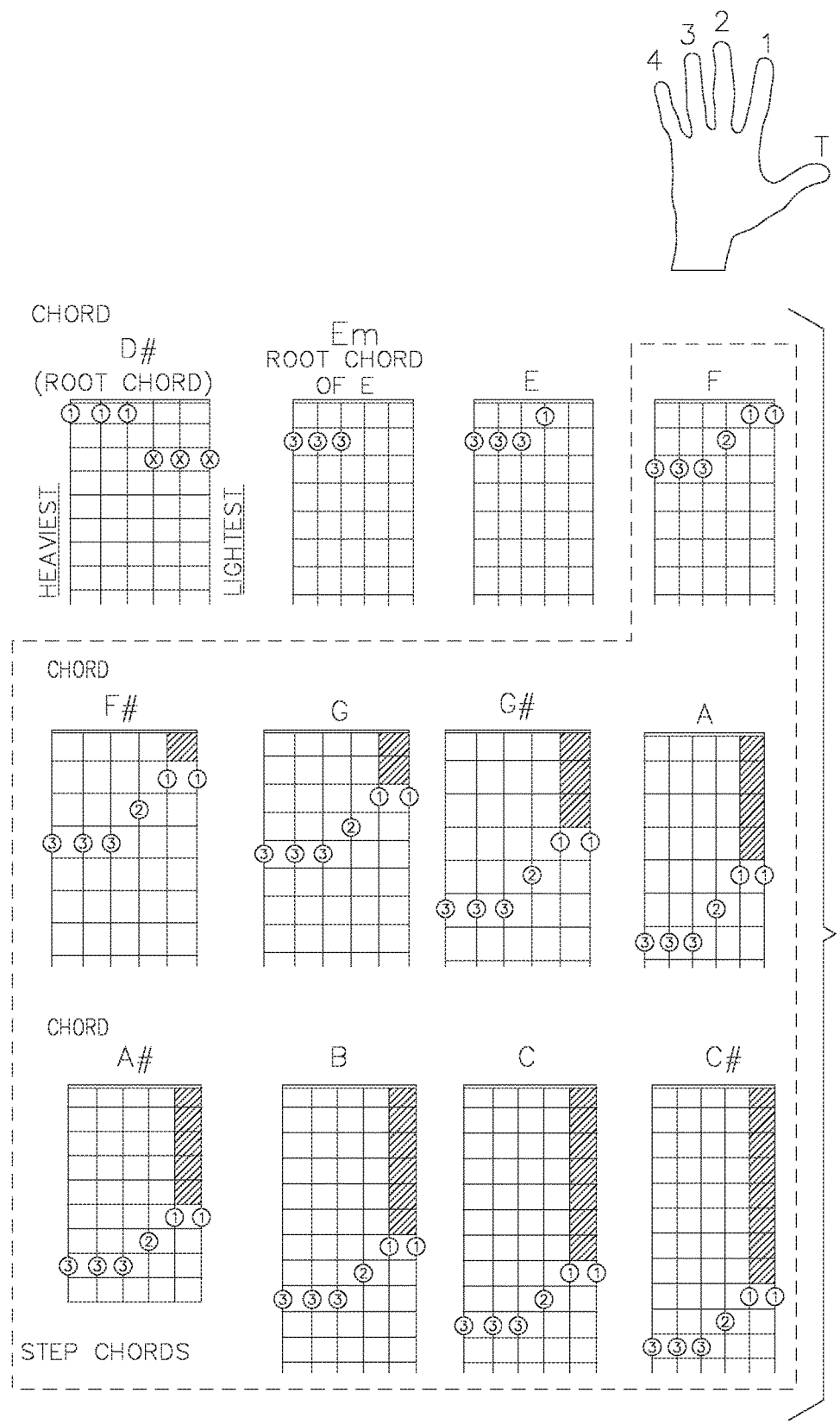
FIG. 10A is a front view of a left-handed musical scale.
Figure 11A:
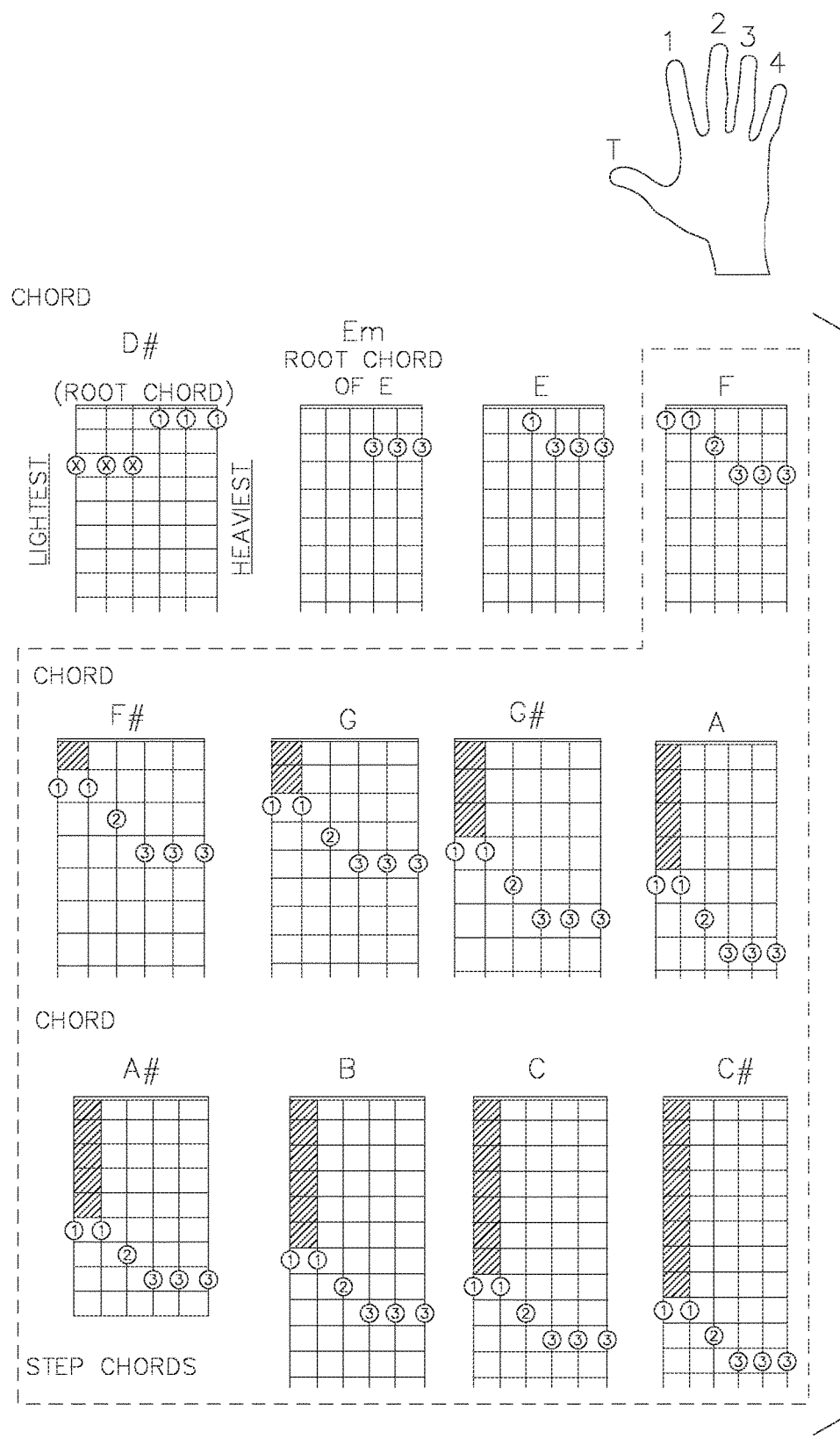
FIG. 11A is a front view of a right-handed musical scale.

FIG. 4 includes the three string chord table 20. The three string chord table 20 indicates that when strumming the fourth through sixth string without applying pressure against the strings, the guitar plays a D chord. The three string chord table 20 further indicates that holding the fourth string, the fifth string, and the sixth string simultaneously in a single fret of the fret board plays a D # chord for the first fret, an E chord for the second fret, an F chord for the third fret, an F # chord for the fourth fret, a G chord for the fifth fret, a G # chord for the sixth fret, an A chord for the seventh fret, an A # chord for the eighth fret, a B chord for the ninth fret, a C chord for the tenth fret, a C # chord for the eleventh fret, and a D chord for the twelfth fret.

FIGS. 5A through 5C illustrate a right handed and left handed guitar with the guitar neck 12, the frets 14, the six strings, and a player playing the guitar using the method of the present invention. The player places his finger 22 against the three strings, including the fourth string, the fifth string, and the sixth string. When holding the strings mentioned above down within the first fret and strumming the guitar, the chord D # is played. The fingering 24 is illustrated by the black dots in FIG. 5C.

FIGS. 6A through 7D illustrate a right handed and left handed guitar with the guitar neck 12, the frets 14, the six strings, and a player playing the guitar using the method of the present invention. The player places his fingers 22 against the three strings, including the fourth string, the fifth string, and the sixth string. FIG. 6A through 7D illustrate fingers 22 applying pressure against the three strings including the fourth string, the fifth string, and the sixth string plus additional strings including at least one or more of the first string, the second string, and the third string to play an F major chord and an F minor chord.

FIG. 10A through 11B illustrate right and left-handed musical scales that may be played using the present invention. All major and minor chords can now be played using six strings. All major and minor chords can be played using three strings. Once the setup has been established the method may include the following. "D" now becomes the primary focus as well as the first note learned. The first chord learned is the lowest chord, "D" (made by playing three lowest strings with an open fret: D-A-D). Three String Chords (referred to as root chords) beginning with D #, E, F, F #, G, G #, etc. can be played using the same finger pattern as the root chord of D # and moving up the fret board. Over a dozen chords may be played this way, as shown on the root chord chart. Then we progress to six string chords. Six string chords for all major chords can be played using the same finger pattern of F major and moving up the fret board. Six String Chords for all minor chords can be played using the same finger pattern of F minor and moving up the fret board. The correlated charts are referred to as "Using the F Chord"; these chords and charts offer a "sounding board" that makes learning basic chords easier. The player may wish to play only three string chords, and/or learn to play larger chords later.

It should be understood, of course, that the foregoing relates to exemplary embodiments of the invention and that modifications may be made without departing from the spirit and scope of the invention as set forth in the following claims.

What is claimed is:

1. A method of tuning, learning and playing a guitar comprising steps of:
   providing a guitar comprising a fret board and a plurality of strings, wherein the fret board comprises at least a first fret, a second fret, a third fret, a fourth fret, a fifth fret, and a sixth fret, and the plurality of strings comprise at least a first string, a second string, a third string, a fourth string, a fifth string, and a sixth string, wherein a thickness of each string increases from the first string being a thinnest string to the sixth string being a thickest string;
   stringing the guitar such that the first string is at a top of the fret board and stringing a remainder of the strings consecutively until the sixth string is at a bottom of the fret board; and
   tuning the guitar such that the fourth string plays a D note, the fifth string plays an A note, and the sixth string plays a D note.

2. The method of claim 1, wherein holding the fourth string, the fifth string, and the sixth string simultaneously in a single fret of the fret board plays a D # chord for the first fret, an E chord for the second fret, an F chord for the third fret, an F # chord for the fourth fret, a G chord for the fifth fret, and a G # chord for the sixth fret.

3. The method of claim 1, wherein the fret board of the guitar further comprises a seventh fret, an eighth fret, a ninth fret, a tenth fret, an eleventh fret, and a twelfth fret.

4. The method of claim 3, wherein holding the fourth string, the fifth string, and the sixth string simultaneously in the single fret of the fret board plays an A chord for the seventh fret, an A # chord for the eighth fret, a B chord for the ninth fret, a C chord for the tenth fret, a C # chord for the eleventh fret, and a D chord for the twelfth fret.

5. The method of claim 1, further comprising labeling the guitar at each fret with indicia comprising a printed D # at the first fret, a printed E at the second fret, a printed F at the third fret, a printed F # at the fourth fret, a printed G at the fifth fret, and a printed G # at the sixth fret.

6. The method of claim 2, further comprising labeling the guitar at each fret comprising a printed D # at the first fret, a printed E at the second fret, a printed F at the third fret, a printed F # at the fourth fret, a printed G at the fifth fret, and a printed G # at the sixth fret, a printed A at the seventh fret, a printed A # at the eighth fret, a printed B at the ninth fret, a printed C at the tenth fret, a printed C # at the eleventh fret, and a printed D at the twelfth fret.

7. The method of claim 1, further comprising steps of:
providing a chord card comprising a plurality of printed indicia spaced apart; and
placing the chord card underneath at least the first string of the guitar such that a printed D # is disposed in the first fret, a printed E is disposed in the second fret, a printed F is disposed in the third fret, a printed F # is disposed in the fourth fret, a printed G is disposed in the fifth fret, and a printed G # is disposed in the sixth fret.

8. The method of claim 7, wherein the chord card further comprises additional printed indicia such that a printed A is disposed in the seventh fret, a printed A # is disposed in the eighth fret, a printed B is disposed in the ninth fret, a printed C is disposed in the tenth fret, a printed C # is disposed in the eleventh fret, and a printed D is disposed in the twelfth fret.

9. The method of claim 7, wherein the chord card further comprises a fold and a second set of printed indicia comprising an upside down version of the plurality of printed indicia and separated by the fold.

10. A method of tuning, learning and playing a guitar comprising steps of:
providing a guitar comprising a fret board and a plurality of strings, wherein the fret board comprises at least a first fret, a second fret, a third fret, a fourth fret, a fifth fret, and a sixth fret, and the plurality of strings comprise at least a first string, a second string, a third string, a fourth string, a fifth string, and a sixth string, wherein a thickness of each string increases from the first string being a thinnest string to the sixth string being a thickest string;
holding the guitar in a right-handed position such that a right hand is strumming the plurality of strings;
stringing the guitar such that the first string is at a top of the fret board and stringing a remainder of the strings consecutively until the sixth string is at a bottom of the fret board;
tuning the guitar such that the fourth string plays a D note, the fifth string plays an A note, and the sixth string plays a D note;
holding the fourth string, the fifth string, and the sixth string simultaneously in a single fret of the fret board; and
strumming the plurality of strings with the right hand.

\* \* \* \* \*